Patented Feb. 20, 1934

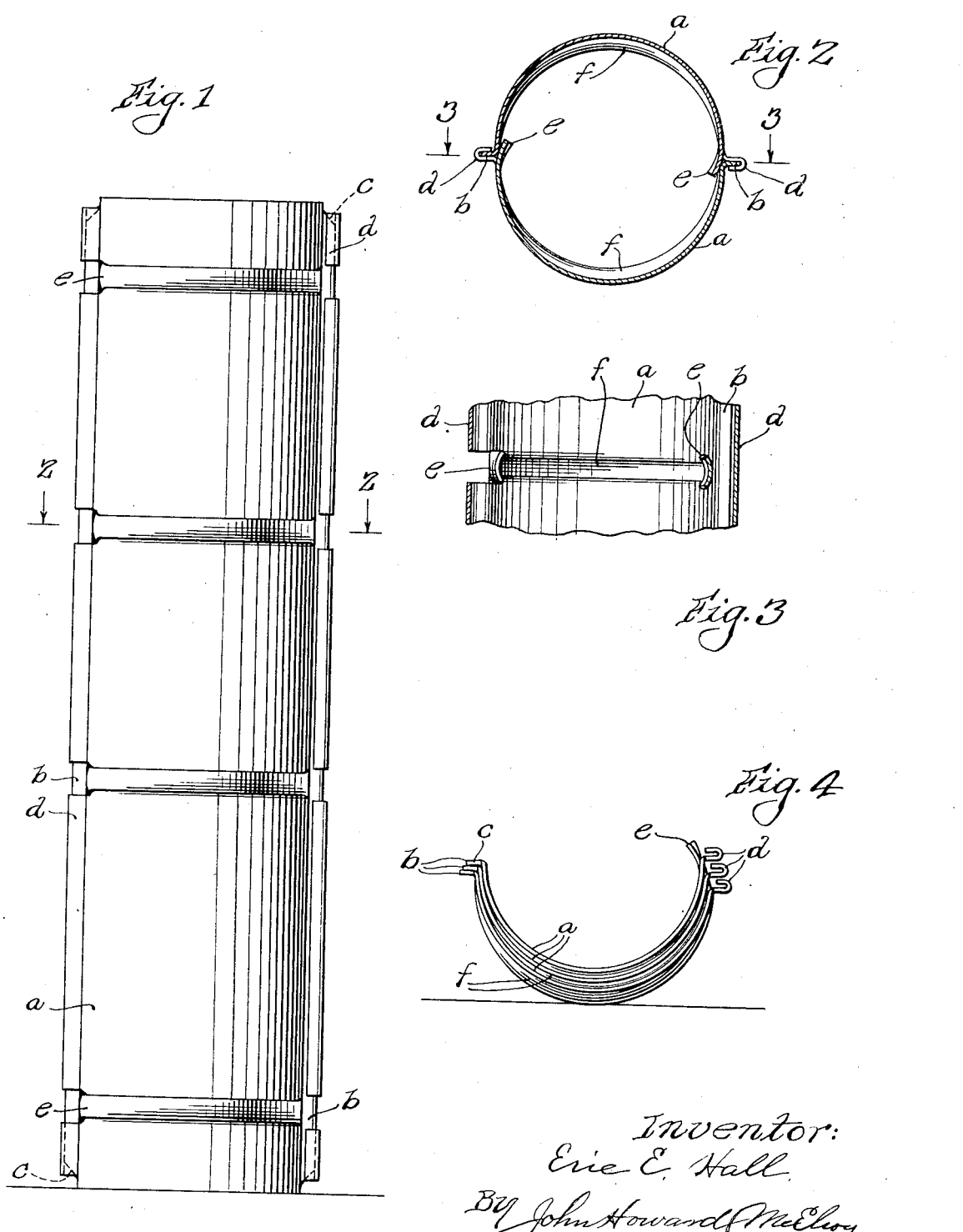

1,948,232

UNITED STATES PATENT OFFICE 1,948,232

PIPE

Eric E. Hall, Chicago, Ill.

Application August 6, 1931. Serial No. 555,505

6 Claims. (Cl. 137—75)

My invention is concerned with pipes or sleeves, preferably formed of metal, which I have designed primarily for use in connection with the structure shown in my Patent No. 1,434,382, dated November 7, 1922, but which are capable of use elsewhere.

As these pipes or sleeves are used in erecting large buildings in very considerable quantities, the ordinary pipe construction is highly objectionable on account of the space occupied in storage, and the small number that can be carried by a single individual. To overcome these objections, I form my pipe or sleeve of two preferably identical halves that can be nested together before assembly while the halves are still separated for storage or transportation, but which can be quickly assembled when the are to be used.

To illustrate my invention, I annex hereto a sheet of drawings in which the same reference characters are used to designate identical parts in all the figures, of which—

Fig. 1 is an elevation of a pipe embodying my invention, supported in a vertical position;

Figure 2 is a section on the line 2—2 of Fig. 1;

Fig. 3 is a fragmentary view in section on the line 3—3 of Fig. 2; and

Fig. 4 is an end elevation showing some of the halves nested.

In carrying out my invention in its preferred form, I preferably employ some cheap sheet metal, such as galvanized iron, which can be readily formed up into the design shown by dies, so that it can be produced very cheaply. A section of pipe is preferably formed of two identical halves, each one consisting of the semi-cylindrical portion $a$ which has on one edge the preferably radially extending outwardly directed flange $b$, having its ends beveled at $c$ and intended to slide into the hook $d$ formed on the other edge. To prevent the halves being separated by external pressure directed inwardly, I provide the edge on which the hook $d$ is formed at intervals with lugs $e$, which are preferably formed by a portion of the metal that would otherwise form the hook $d$, the continuity of the hook $d$ being interrupted, as it were, by the lugs $e$, which are rounded off, as best seen in Fig. 3, so that the beveled ends $c$ will slide over the same without the possibility of catching when the two parts are slid together in assembly.

I preferably employ transverse strengthening ribs $f$, which are formed in the body of the metal, and which are preferably in the same transverse plane as the lugs $e$.

The operation of assembling the two halves of the pipe will be readily apparent, as the ends of the flanges $b$ are brought into register with the ends of the hooks $d$ and the two parts are slid together by a longitudinal movement.

While I have shown and described my invention as embodied in the form which I at present consider best adapted to carry out its purposes, it will be understood that it is capable of modifications, and I do not desire to be limited in the interpretation of the following claims, except as may be necessitated by the state of the prior art.

What I claim as new and desire to secure by Letters Patent of the United States is:

1. As a new and useful article of manufacture, a pipe consisting of two portions, each of which is provided on its longitudinal edges with interlocking means whereby they can be quickly united to form a complete pipe, said interlocking means consisting of a generally radially directed flange extending along one edge and a hook extending along the other edge, provided with opposed lugs to prevent the flange being sprung out of the hook, the ends of the flange being beveled and the surfaces of the lugs contacting the opposed portion being cooperatively rounded, so that the two portions are interlocked by sliding them together by a longitudinal movement.

2. As a new and useful article of manufacture, a pipe consisting of two portions, each of said portions being provided on one longitudinal edge with a generally radially directed flange, and on the other edge with a hook extending therealong, and transverse strengthening ribs and lugs to prevent the flange being sprung out of the hook, said lugs being formed at the end of the ribs by the material elsewhere forming the hook.

3. As a new and useful article of manufacture, a pipe consisting of two or more straight portions, each of which is provided on its longitudinal edges with interlocking means whereby they can be quickly united to form a complete pipe by merely sliding them together by a longitudinal movement, said interlocking means consisting of a generally radially-directed flange extending along one edge of a portion and cooperating with a hook extending along the cooperating edge of another portion, each of the hook edges being provided with internal opposed lugs to prevent the flange being sprung out of the hook.

4. As a new and useful article of manufacture, a pipe consisting of two straight portions, which portions are provided on their longitudinal edges with interlocking means whereby they can be quickly united to form a complete pipe merely by sliding the two portions together by a longitudinal movement, said interlocking means consisting of a pair of generally radially-directed flanges on one pair of edges adapted to co-operate with a pair of hooks on the other two edges, and opposed internal lugs on the hook edges to prevent a flange being sprung out of its hook by an inwardly directed movement.

5. As a new and useful article of manufacture, a pipe consisting of two or more straight portions each of which is provided on its longitudinal edges with interlocking means whereby they can be quickly united to form a complete pipe by merely sliding them together by a longitudinal movement, said interlocking means consisting of a generally radially-directed flange extending along one edge of a portion and co-operating with a hook extending along the co-operating edge of another portion, each of the hook edges being provided with internally opposed lugs to prevent the flange being sprung out of the hook, and the ends of the flanges being beveled and the outer surfaces of the lugs contacting the opposed portion being co-operatively rounded so that the two portions may be interlocked by sliding them together by a longitudinal movement without the ends of the flanges catching on the hooks.

6. As a new and useful article of manufacture, a pipe consisting of two or more straight portions, said portions being provided on some of their longitudinal edges with generally radially-directed flanges co-operating with hooks extending along the remaining edges, and transverse strengthening ribs and lugs on the hook edges to prevent the flanges being sprung out of the hooks, said lugs being formed at the ends of the ribs by the material elsewhere forming the hooks.

ERIC E. HALL.